March 1, 1932.  M. J. LACHANCE  1,847,770
SCALE
Original Filed May 5, 1926
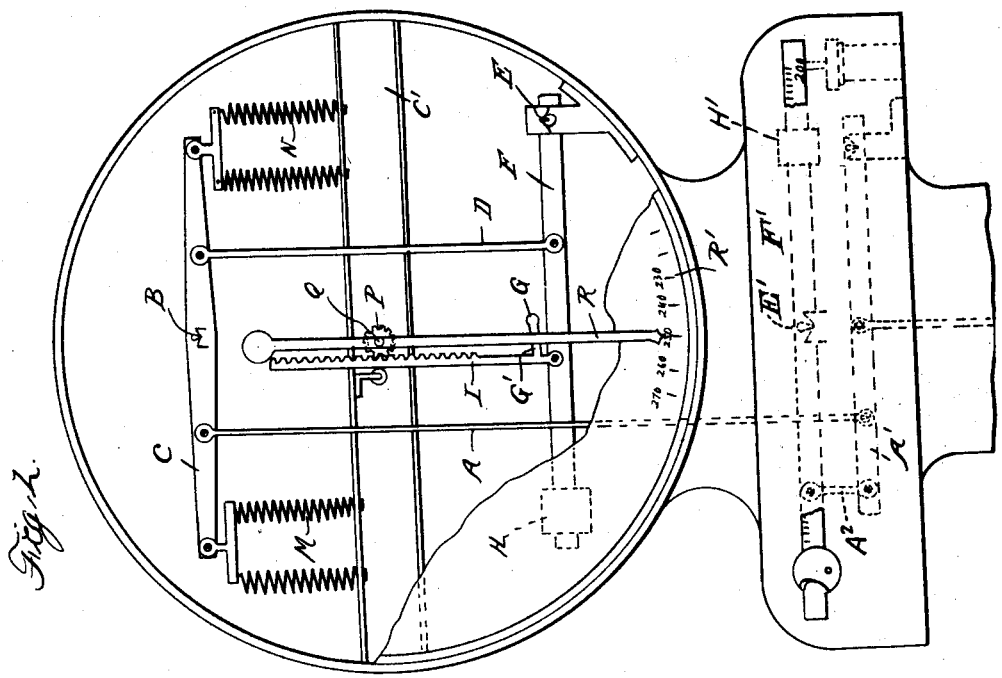
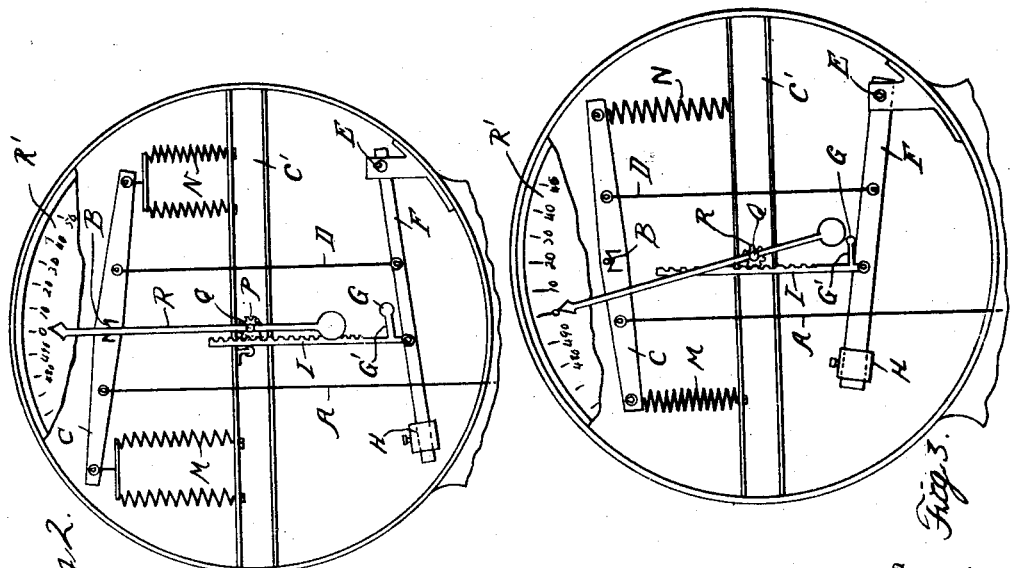
Inventor
Modeste J. Lachance
By
Attorneys Patented Mar. 1, 1932

1,847,770

UNITED STATES PATENT OFFICE

MODESTE J. LACHANCE, OF LOUISVILLE, KENTUCKY, ASSIGNOR TO WALTER F. STIMPSON, OF LOUISVILLE, KENTUCKY

SCALE

Application filed May 5, 1926, Serial No. 106,955. Renewed July 31, 1931.

The invention relates to scales and consists in the novel construction through which there is effected automatic compensation for temperature variations and inaccuracies in level as hereinafter set forth;

In the drawings;

Figure 1 is a front elevation partly broken away.

Figures 2 and 3 are diagrammatic views showing portions of Figure 1 in different positions of adjustment.

Simple spring scales when subjected to temperature changes will vary through elongation or contraction of the metal of the spring. To compensate for this effect constructions have been devised in which two springs are opposed to each other and the weighing is effected by a differential action. This, however, requires the loading of one of the springs to bring the indicator to the zero point, so that in half capacity position the springs will be equal in tension.

While the spring constructed as described will, to a considerable extent, automatically compensate for temperature variations, it has been found necessary to keep the scale accurately level. This is for the reason that the loading of the spring introduces a gravity element which would be affected by any change of level whereas a pure spring balance is unaffected by gravity. I have, however, devised a construction which permits of loading the spring and at the same time avoiding any variation through moderate changes of level, the construction being as follows;

M and N are springs or groups of springs acting counter to each other as for instance by connection to opposite ends of the beam or lever C fulcrumed at B. A is the steelyard rod connected to the beam C and leading directly or indirectly to the weighing platform not shown. The springs M and N are so connected with the lever C as to be under approximately equal tension when in half capacity position. When, however, the position of the parts is for zero load one of the springs or groups of springs such as M is under greater tension and the other spring or springs N are partly relieved of tension, this being accomplished by gravity loading.

As has been stated it is an object of the invention to load the spring in such a manner that a change in level will not affect the tension. This I have accomplished by dividing the gravity load and supporting the separate portions thereof on levers extending oppositely from their fulcrum points. Thus, as shown in Figure 1, F is a lever fulcrumed at E and carrying the weight H, said lever being connected by the rod D to the lever B. F' is a second lever fulcrumed at E' and carrying the weight H'. The lever F' is so connected to the lever C that the weight H' will act in unison with the weight H in loading the spring N. Thus, as specifically shown, the steelyard A is connected to a lever A' which in turn is connected by a link A² with the lever F'. Any downward movement of the steelyard A will rock the lever F' so as to raise the weight H' and correspondingly any downward movement of the steelyard A will rock the lever B and through the rod D the lever F so as to raise the weight H.

Any suitable indicator may be operated by the mechanism and connected thereto in any suitable way but as shown the rack bar I connected to the lever F engages the pinion P on the indicator shaft Q which operates the indicator hand R. The rack bar I is held in engagement with the pinion by the laterally extending arm G' and weight G.

With the construction as described when the scale is properly sealed and in operative condition the normal position of parts is as shown in Figure 2. Here the springs M are under full tension and the springs N are relieved. On the other hand when the scale is loaded to full capacity the parts will be in the position shown in Figure 3, the spring N being under full tension and the spring M being relieved. The half load position is shown in Figure 1 where the springs M and N are both under approximately equal tension.

If in placing the scale it stands out of level so as to tilt it one way or the other in the plane of the levers C, F and F', as, for instance, indicated in Figure 3, this will not affect the loading of the spring or the accuracy of weight of the scale. This is for the reason that a tilting of the scale to the left will increase the effectiveness of the weight H operating upon the lever F but at the same time it will decrease the effectiveness of the weight H' operating upon the lever F'. The sum of the effective weights will be the same in whatever position the scale is tilted. Also as the springs M and N will be correspondingly affected by any temperature changes the change of effective action by one will be largely compensated for by an opposite change of effectiveness of the other.

What I claim as my invention is:

1. In a scale the combination with lever mechanism, of springs connected to act oppositely on said lever mechanism and a divided gravity actuating loading means for one of said springs, the two portions thereof being adapted to mutually compensate for changes from level.

2. In a scale, the combination with lever mechanism, of opposed springs operating on said mechanism and arranged to be under equal tension in half capacity position and a divided gravity actuating loading means for one of said springs, the two portions thereof being adapted to mutually compensate for changes from level.

3. In a scale, the combination with lever mechanism, of springs acting on said lever mechanism in opposition to each other to compensate for temperature variations and a divided gravity actuated loading means for one of said springs, the two portions thereof being adapted to mutually compensate for changes from level.

4. In a scale the combination with lever mechanism, of springs acting on said lever mechanism in opposition to each other to compensate for temperature variations, two weighted levers extending in opposite directions from their fulcrums and connected to act in unison in loading one of said springs whereby said levers will mutually compensate for changes from level.

In testimony whereof I affix my signature.

MODESTE J. LACHANCE.